UNITED STATES PATENT OFFICE 2,257,422

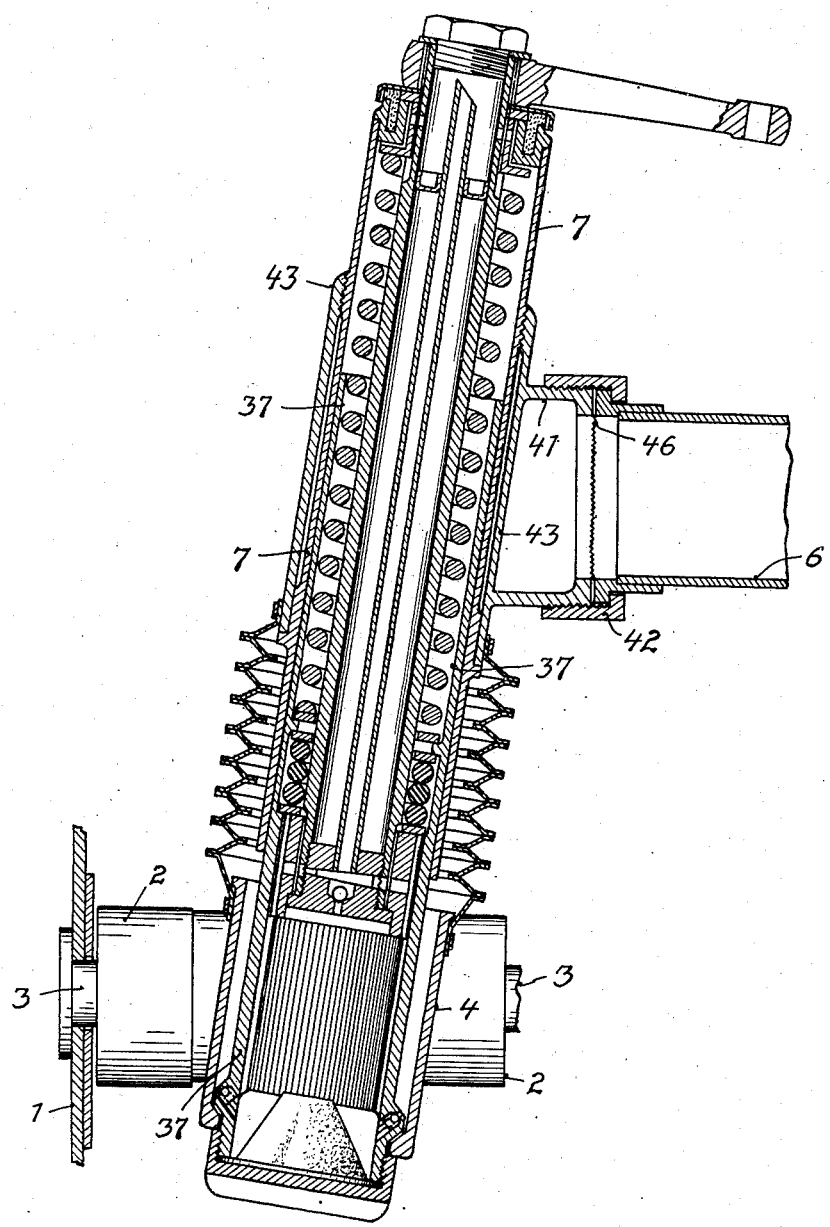

JOINT FOR WHEEL SUSPENSION DEVICES

Friedrich Eugen Maier, Berlin-Charlottenburg, Germany

Original application November 27, 1935, Serial No. 51,820. Divided and this application May 6, 1940, Serial No. 333,689. In Germany August 29, 1935

1 Claim. (Cl. 280—96.2)

This is a divisional application of my prior patent application Ser. No. 51,820, dated November 27, 1935, now Patent Number 2,220,254, granted November 5, 1940, and relates to a joint between an individual wheel suspension of the telescopic type and the tubular axle member forming part of the chassis of a motor vehicle.

It is an object of the present invention to provide an adjustable connection between said telescopic device and the tubular axle member of the vehicle.

Another object of the invention is to provide a detachable connection between the telescopic device and the tubular axle member of the vehicle.

With these objects in view, the telescopic device is provided with a transverse tubular member and a similar tubular member or axle member is arranged on the vehicle or extends transversely through the vehicle. The two tubular members are swingably and detachably connected by a threaded ring adapted to be screwed on one of said members and to engage by means of an inner flange behind an outer flange of the opposite member, and the adjacent faces of the two tubular members are toothed for mutual engagement.

By swinging the telescopic wheel suspension device about the axis of the transverse members it is possible to adjust the "forward setting" of the wheel suspension, i. e. the angle between the vertical and the axis of the wheel suspension, or in other words, the angle by which the axis of the wheel suspension is forwardly inclined towards the road, and to lock the wheel suspension in position.

The telescopic device comprises an upper guiding cylinder 7 and a lower tubular guiding member 37 seated at its lower end in a sleeve 4 which is fixedly secured to an axle tree box 2. The axle 3 is supported in the axle tree box 2 and carries a wheel 1.

The guiding cylinder 7 is surrounded by a sleeve 43 to which a transverse tubular member 41 is connected by welding. The end of a tubular axle 6 forming part of the chassis of the vehicle (not shown) can be connected to the tubular member 41 by a threaded ring 42 engaging by means of an inner flange behind an outer flange on the tubular axle member 6. The parts 6 and 41 are secured against rotation or swinging with respect to each other by engagement of their toothed portions 46 formed on the adjacent surfaces of the two parts. The teeth of said toothed surfaces are very small so that the whole telescopic device can be swung about the axis of the tube 6 on release of the threaded ring 42, whereby it is possible to adjust the above mentioned forward setting of the wheel suspension in the desired manner and to lock the parts in the adjusted position by interengagement of their toothed portions 46.

The details of the parts shown in the drawing have been described fully in my above mentioned Patent No. 2,220,254 so that it will not be required to discuss said details here.

Compared to simple connections comprising tubular sleeves my novel connection offers the advantage that it permits accurate adjustment. Moreover, the strength is higher, since the tube ends which are held together by the threaded ring 42 engage each other under pressure. The known joints comprising tubular sleeves also have the drawback that they are not accurately adjustable and moreover are unfavourable as to their mechanical strength, more particularly with respect to bending stresses at the joint.

Joints comprising solid axle stubs and cross pins are not sufficiently strong, compared to my novel joint, with respect to torsional stress. The joint is torsionally stressed in accordance with the variable distance of the vehicle from the road and the changing acceleration and retardation of the craft, with a lever arm corresponding to the distance of the parts from the road. Such stresses, on the other hand, are safely taken up by my novel joint since notching effects and the like are prevented.

Moreover, none of the known joints can be regarded as an easily detachable joint and my novel joint is lighter in weight.

The method and apparatus of the present invention have been described in detail with reference to a specific embodiment. It is to be understood, however, that the invention is not limited by such specific reference but is broader in scope and capable of other embodiments than that specifically described and illustrated in the drawing.

I claim:

Independent wheel suspension, comprising a telescopic guide system for the springing motion of the suspension, said system including a tubular member extending transversely on said telescopic system, a tubular axle member forming part of the chassis of the vehicle, one of said members being screw threaded, a threaded ring screwed on said screw threaded members, said ring having an inner flange portion engaging behind an outer flange portion of the opposite member, for detachably connecting said members together, the adjacent faces of said tubular members being toothed for mutual engagement, whereby the telescopic guide system can be swung with respect to said tubular axle member by releasing said threaded ring and locked in position by tightening said ring.

FRIEDRICH EUGEN MAIER.